United States Patent
Rounds

[11] Patent Number: 6,084,322
[45] Date of Patent: Jul. 4, 2000

[54] AMPLIFYING MECHANICAL ENERGY WITH MAGNETOMOTIVE FORCE

[76] Inventor: Donald E. Rounds, 3111 NW. Norwood Pl., Corvallis, Oreg. 97330

[21] Appl. No.: 09/294,078

[22] Filed: Apr. 19, 1999

[51] Int. Cl.[7] .......................... H02K 37/00; H02K 49/00
[52] U.S. Cl. ........................... 310/46; 310/103; 310/112; 310/114
[58] Field of Search ..................... 310/152, 156, 310/154, 162, 103, 83, 80, 46, 92, 75 D, 114, 112; 464/29; 74/63, 37

[56] References Cited

U.S. PATENT DOCUMENTS

| Re. 29,165 | 3/1977 | Bode | 310/46 |
|---|---|---|---|
| 2,243,555 | 5/1941 | Faus | 172/284 |
| 2,378,129 | 6/1945 | Chamber | 172/284 |
| 3,267,310 | 8/1966 | Ireland | 310/103 |
| 3,355,645 | 11/1967 | Kawakami et al. | |
| 3,790,833 | 2/1974 | Hasebe | 310/162 |
| 4,074,153 | 2/1978 | Baker | 310/12 |
| 4,151,431 | 4/1979 | Johnson | 310/152 |
| 4,169,983 | 10/1979 | Felder | 310/46 |
| 4,751,486 | 6/1988 | Minato | 310/156 |
| 4,877,983 | 10/1989 | Johnson | 310/152 |
| 5,034,642 | 7/1991 | Hoemann et al. | 310/156 |
| 5,569,967 | 10/1996 | Rode | 310/103 |
| 5,886,608 | 3/1999 | Chabay | 310/103 |

FOREIGN PATENT DOCUMENTS

| 62-114466 | of 0000 | Japan. |
|---|---|---|
| 62-81972 | of 0000 | Japan. |

OTHER PUBLICATIONS

"Electric Motors & Electronic Motor Techniques" by J. M. Gottlieb; 1st Ed.; 1976 Howard M. Sims & Co., Inc.; The Bobs–Merrill Co., Inc.; Indianapolis, Kansas City, New York.

*Primary Examiner*—Nestor Ramirez
*Assistant Examiner*—Tran N Nguyen
*Attorney, Agent, or Firm*—William W. Haefliger

[57] ABSTRACT

A magnetically operating device comprises a driven magnet having magnetically opposite poles which are separated, a driver magnet having magnetically opposite poles, and the magnets are mounted for relative movement to maintain one of the driver magnet's poles substantially equidistant from the poles of the driven magnets as the driven magnet moves relative to the driver magnet. A first rotor may mount the driven magnet or magnets for rotation about a first axis, and a second rotor may mount the driver magnet or magnets for rotation about a second axis, and such axes are typically non intersecting and skewed, the rotors being intercoupled. A source of torque such as a motor may be coupled to the second rotor to effect torque input to the second rotor.

22 Claims, 7 Drawing Sheets

REPULSION

ATTRACTION

NO EFFECT

Н6,084,322

AMPLIFYING MECHANICAL ENERGY WITH MAGNETOMOTIVE FORCE

FIELD OF THE INVENTION

This invention relates generally to the utilization of the potential energy in magnets, as for example permanent magnets; and more particularly to a device wherein one or more magnets is caused to move unimpeded past a second magnet or magnets, while creating a strong unidirectional movement of the second magnet or magnets.

BACKGROUND OF THE INVENTION

More than 85% of energy being consumed today is that from fossil fuels. Although this has many advantages, it has been estimated that the world's reserves of both oil and natural gas will be depleted, at the current rate of consumption, by the year 2024 (Science, vol. 245, pp. 1330–1331, 1989). Moreover, the burning of fossil fuel produces both gaseous and particulate pollutants which cause extensive damage to crops and plants, deterioration of paint, rubber and textiles, and contributes significantly to reduced respiratory function and production of cancer in humans. There is also strong evidence that the gaseous byproducts of this energy source are contributing to global warming and acid rain. The magnitude of these economic and environmental problems has become so serious that it is imperative that the use of fossil fuels be reduced without compromising the application of this energy source.

Permanent magnets have long been known to contain strong potential energy, but this has only been used in motors or generators, to date, in the form of stators which create or direct electromotive forces, not as a physical supplement to those forces. The present invention has potential for generating greater forces in existing electric or gasoline motors, wind powered generators, human powered bicycles or other such devices without using additional fuel or creating additional environmental pollutants.

SUMMARY OF THE INVENTION

Although the basic principles of magnetic force are well known, it is helpful to briefly summarize these principles as background to describe the method of developing magnetomotive force in terms of the present invention. Basically, permanent magnets are polar, in that such a magnet always has a north pole and a south pole. Opposite poles strongly attract each other while like poles repel each other. The force of attraction between any two magnets is the result of the force of one magnet ($M_1$) multiplied by the force of the other ($M_2$), divided by the square of the distance between them ($d^2$). This formula: $F=M_1 \times M_2/d^2$, is known as Coulomb's law for magnetic poles.

It is a major object of the invention to take advantage of this law by providing a permanent magnet rotor which turns in a unidirectional motion by interaction with a driver magnet or magnets, which can be made to rotate with a negligible amount of force from any form of engine, but in doing so, it can cause a significant amount of force in the rotor.

Basically the invention is included in a combination of elements, which includes:

a) a rotor incorporating a driven magnet or magnets, positioned with alternately opposite and separated magnetic poles, b) a driver wheel incorporating a driver magnet or magnets, each with a single pole facing the rotor, and c) means for mounting the rotor and wheel for relative movement, to maintain the single pole of each driver magnet or magnets substantially equidistant from the separated magnetic poles of the driven magnet or magnets as the driven magnet or magnets moves relative to the driver magnet or magnets.

As will be seen, the rotor typically mounts the driven magnet or magnets for rotation about a first axis; and the wheel typically mounts the driver magnet or magnets for rotation about a second axis. The two axes are typically skewed, as will appear.

It is another object of the invention to include the provision of means operatively coupled to the rotor and wheel for synchronizing rotation thereof.

Yet another object is the provision of a train of such driven magnets on the rotor. Typically, the driven magnets in the train have north and south poles located in alternating rotary sequence. Such driven magnets may be generally bar-shaped and elongated, as well as uniformly spaced apart along the periphery of the first rotor, such as a flywheel. The driven magnets can alternatively be mounted radially, like spokes in a wheel, with alternating north and south poles at the periphery of the rotor. Typically, bipoles of driven magnets form force zones consisting of north-south regions followed by south-north regions, each of equal length around the circumference of the rotor.

The invention also basically allows one driver magnet to move unimpeded between bipoles defined by the driven magnets, whereby unidirectional movement of the driven magnet rotor is magnetically created. In order to maintain a unidirectional rotation, (e.g. clockwise), the north pole of a driver magnet typically drives a north-south bipole of the driven magnets, while a south pole of a driver magnet typically drives a south-north bipole of the driven magnets.

Magnets can be replaced, or re-charged, after energy depletion, or the device can simply be allowed to "rundown", it having expanded its utility over a useful time interval.

These and other objects and advantages of the invention, as well as the details of an illustrative embodiment, will be more fully understood from the following specification and drawings, in which:

DRAWING DESCRIPTION

Figure 5:
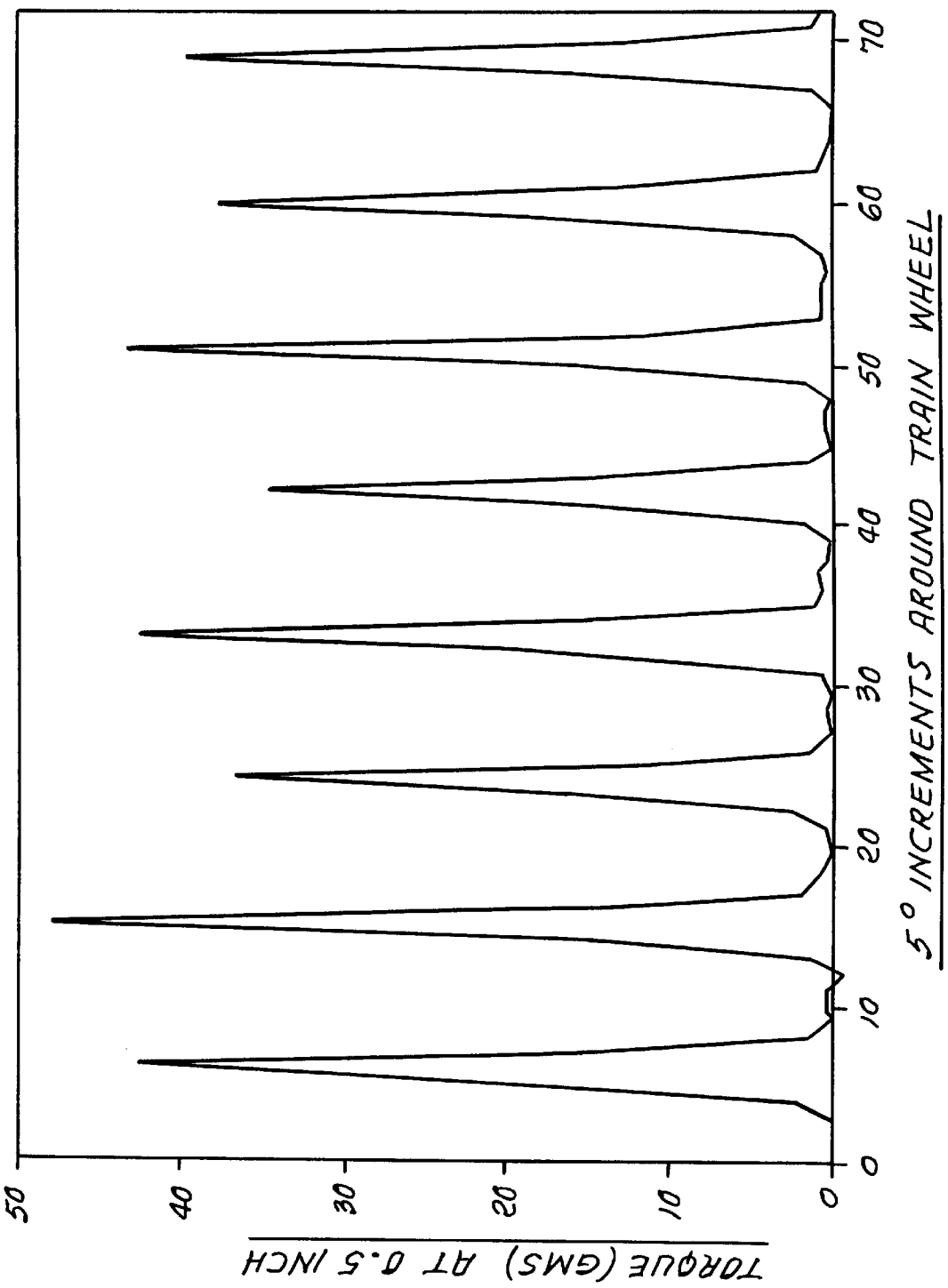
Figure 6:
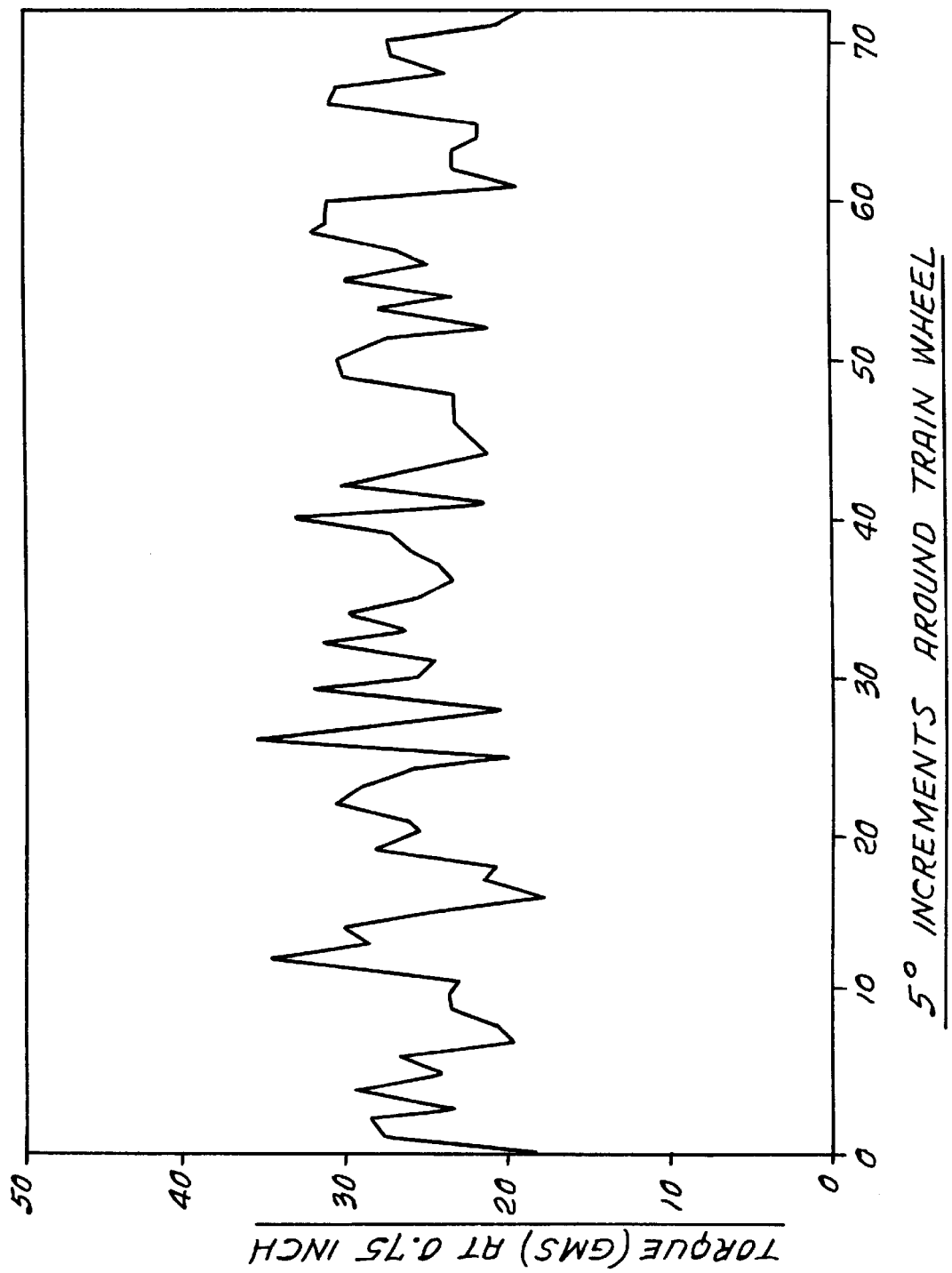
Figure 7:
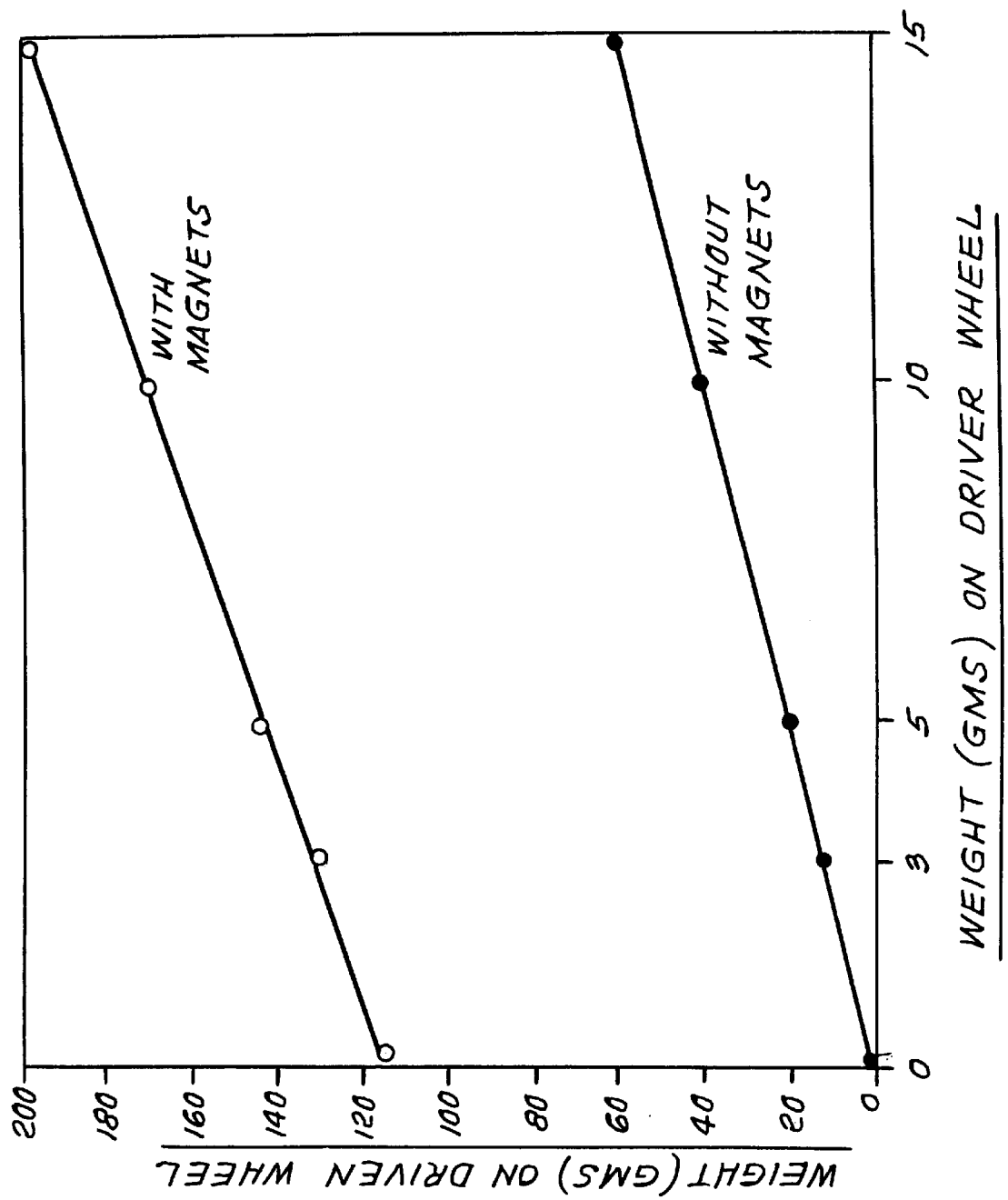
Figure 8:
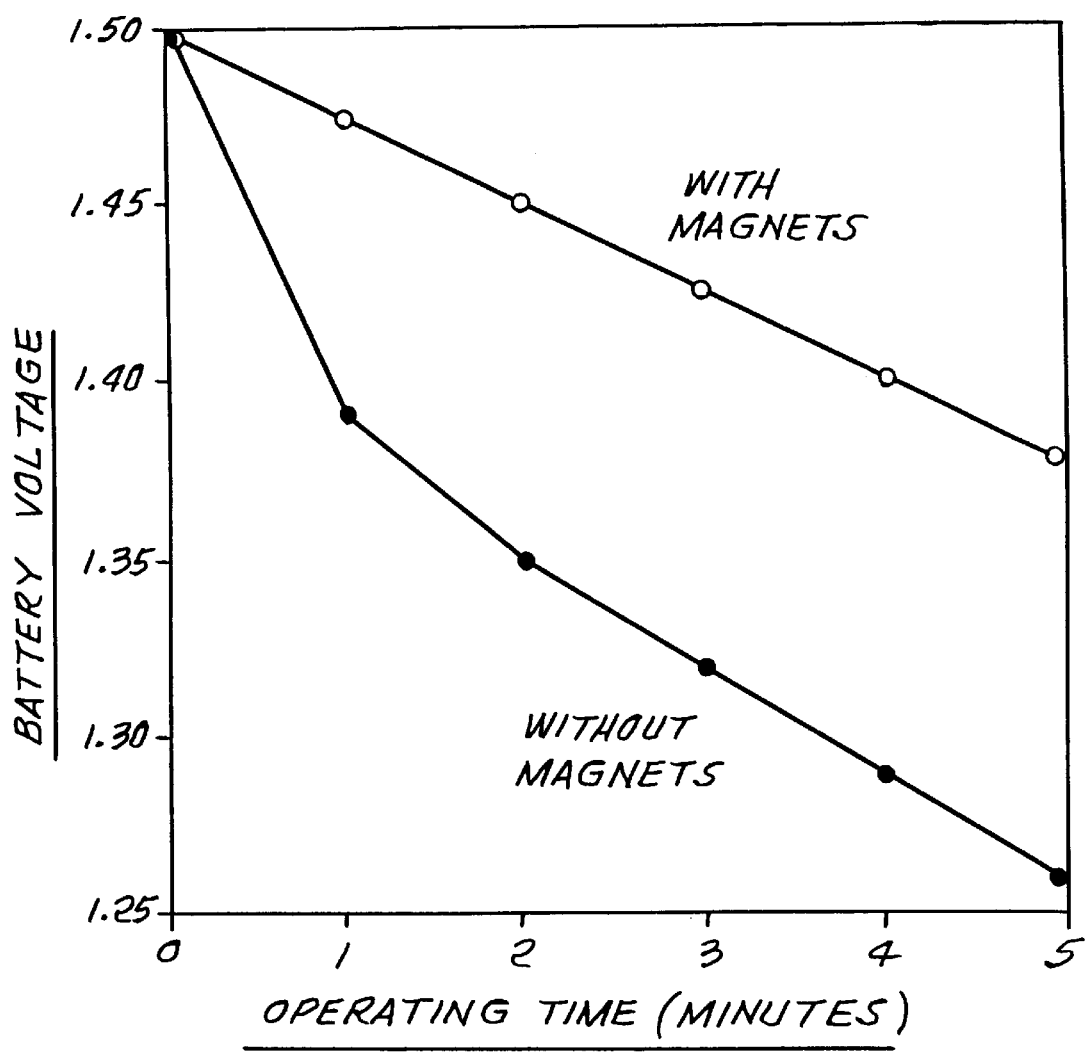

FIGS. 4(A)–4(E) are views showing skewed angularity of driver magnet motion relative to driven magnet motion, where a pole of the driver magnet is always maintained equidistant from bipoles of the rotating train magnets;

FIG. 5 is a graph of torque values generated at each force zone at the time single driver magnets pass between the bipoles of the driven magnets;

FIG. 6 is a graph of torque values generated at each force zone by two sets of three driver magnets at the time they pass between the bipoles of the driven magnets;

FIG. 7 is a graph of the amount of rotation counterbalance required at force zones on the driven rotor with a range of torques being applied to the driver magnet when driven magnets are either absent or present;

FIG. 8 is a graph of the battery voltage decay rate for the electric motor which activates the driver wheel when driven magnets are either absent or present.

DETAILED DESCRIPTION

Figure 1:
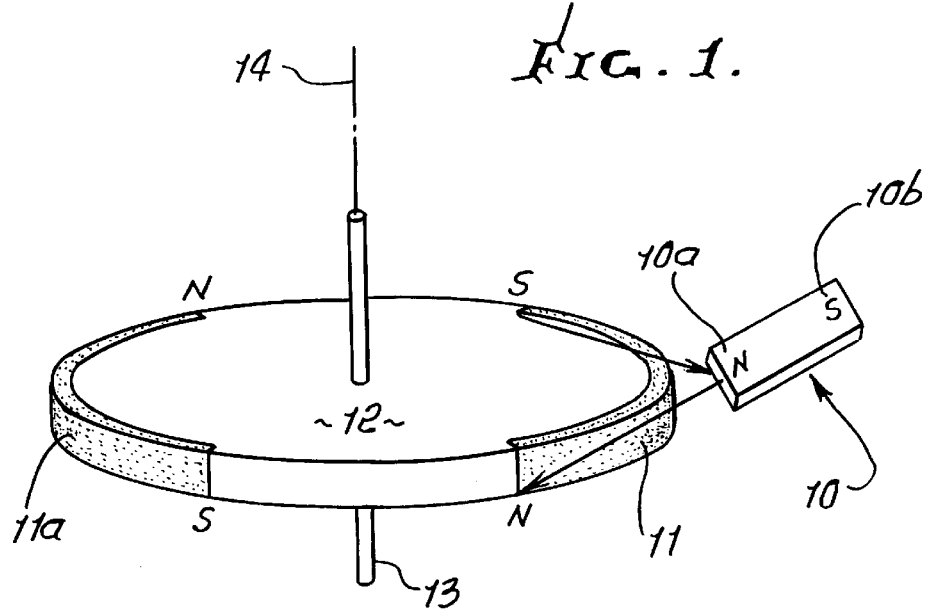
FIG. 1 is a diagram showing principles of the invention.

Referring to FIG. 1, it shows a driver magnet 10 having opposite, as for example north and south poles 10a and 10b. A second magnet 11 is provided on a rotor 12 mounted by an axle 13 to rotate about an axis 14. Multiple second magnets 11 and 11a are depicted in a "train", i.e. at the periphery of the circular rotor, and they are alike and curved, as shown, and spaced along the circular periphery of 12, which may constitute a flywheel. In this configuration, the bar magnets 11 and 11a create north-south force zones while the air gaps between them create south-north force zones.

When the north pole (N) of a bar magnet (the driver magnet) is brought into close proximity to the middle of one of the train magnets on the rotor or flywheel, the north pole (N) of the driver magnet repels the north pole of the train magnet and it simultaneously attracts the south pole (S) of that train magnet. When the driver magnet is held stationary, the train magnet 11 moves with respect to the driver, resulting in an angular displacement (or rotary motion) of the flywheel 12 (FIG. 1) until the south pole of the train magnet stops at its closest point to the north pole of the driver magnet. If, however, the driver magnet is moved away before the south pole of the train magnet reaches that position, the square of the distance between the two magnets is sufficiently great to reduce the force between them to a negligible level. At that point the momentum of the flywheel continues to carry the train magnet along its rotary motion for a period of time. FIG. 1 also shows a second driven magnet 11a, like 11, but at the diametrically opposite rim portion of 12. This can also be acted on by driver magnet 10 when it replaces driven magnet 11 during the rotation.

Figure 2A:
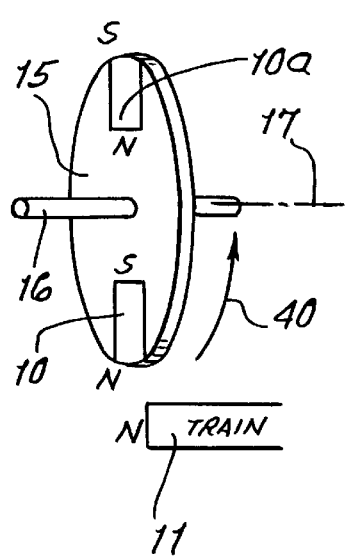
FIGS. 2A, 2B and 2C are likewise diagrams showing principles of the invention.
Figure 2B:
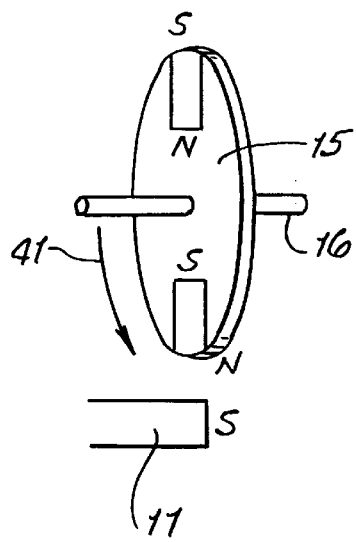
Figure 2C:
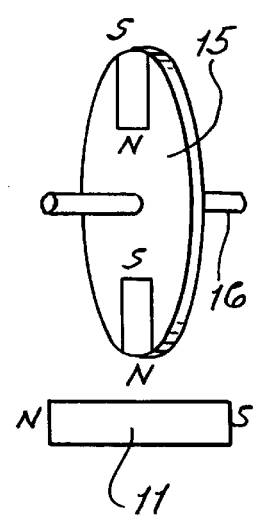

If the driver magnet 10 is mounted radially on a second rotor or flywheel, designated as 15 in FIG. 2(A), the plane of which is approximately perpendicular to that of the first, with the north pole (N) of the driver magnet 10 extending to the margin of the wheel, its rotation will be influenced by the position of the train magnet 11. Again, if the north pole of the driver magnet is in close proximity to the north pole of the train magnet (when the train is held in a stationary position), the driver magnet is repelled (see arrow 40 in FIG. 2A). If the north pole of the driver magnet is in close proximity to the south pole of the train magnet (when the train is held in a stationary position), the driver magnet is attracted (see arrow 41 in FIG. 2B). However, more importantly, if the train magnet 11 is held so that the north pole of the driver magnet is equidistant between the two N-S poles of the train magnet, the attraction and the repulsion of the poles of the train magnet cancel each other and they cannot act to influence the plane of rotation of the vertical wheel holding the driver magnet (FIG. 2C). As a result, the driver wheel 15 can rotate freely through a neutral angular corridor (i.e. angle), without being influenced by the lateral forces of the train magnet 11. Thus, when one pole of the driver wheel magnet is always maintained equidistant from the two poles of each train magnet, there is no effect on the motion of the driver magnet's wheel, but under these same conditions the driver magnet exerts a maximum effect on the train magnet's wheel 12. When a small external motor (as at 24 in FIG. 3) is used to rotate the axle 16 of driver wheel 15, the resulting rotary force of the train magnets strongly amplifies the force of the external motor. This circumstance is the basic principle that permits utilizing the potential energy in permanent magnets for this purpose. Motor 24 is energized by a battery 24a.

FIGS. 2(A), (B) and (C) also show axle 16 for rotor 15; axis 17 of rotation of 15; and a second driver bar magnet 10a extending diametrically opposite magnet 10, and having its south pole (S) at the periphery of 15. Bar magnets 10 and 10a extend radially. Maintaining the peripheral pole of the driver magnet in the neutral corridor requires that the two rotors or wheels 12 and 15 be synchronized as through a chain drive 18 (FIG. 3) or other timed drive (timing belt and sprockets or a set of gears), to produce the following conditions: (1) the turning ratio of the train-to-driver wheels 12 and 15 is typically 1:4; (2) the train magnets must have poles uniformly spaced in N and S sequence on the circumference of the train flywheel; (3) the driver wheel must be mounted on an angle (FIG. 4) described by the hypotenuse of a right triangle, where the base is equal to 0.5 times the distance between the bipoles on the train wheel, while the altitude of the right triangle is equal to 0.25 times the circumference of the driver wheel; and (4) the driver magnet is carefully positioned within the neutral corridor on one train magnet before starting the motion of the external motor.

Figure 3:
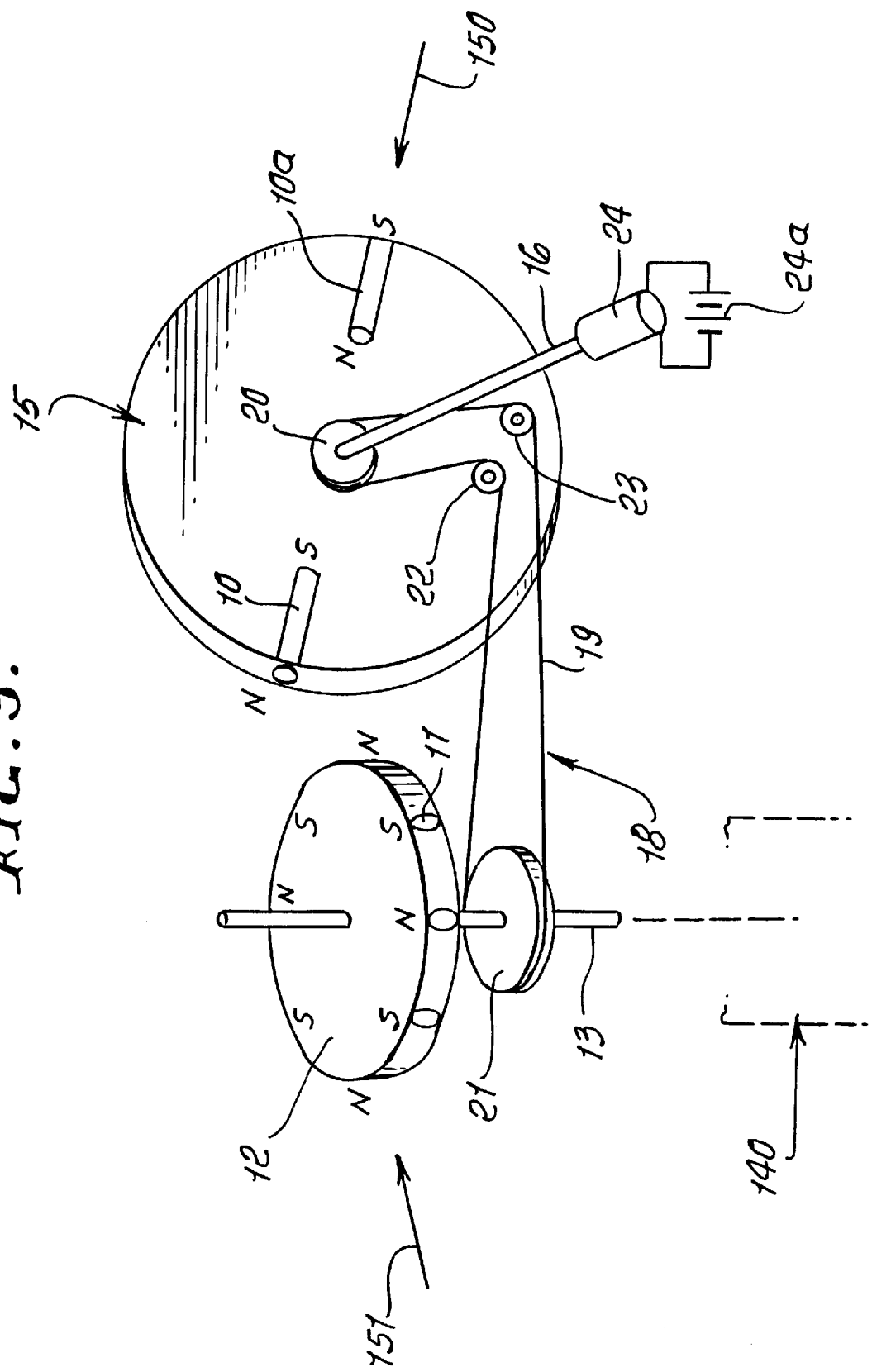
FIG. 3 is a diagram showing basic elements of the invention.
Figure 4A:
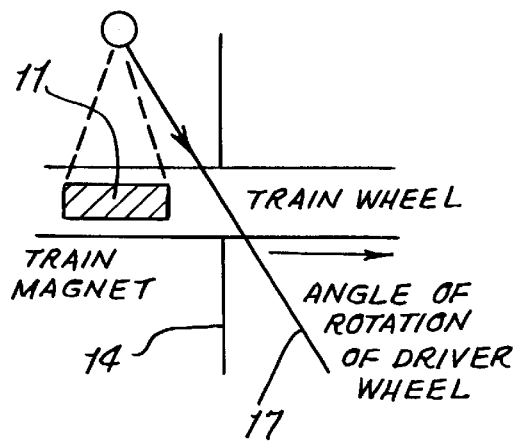
Figure 4B:
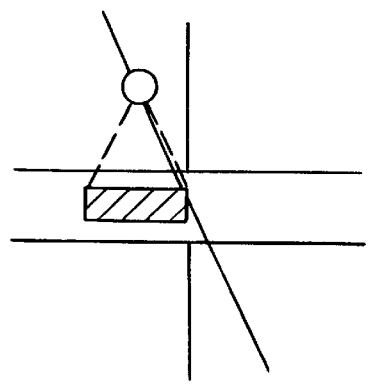
Figure 4C:
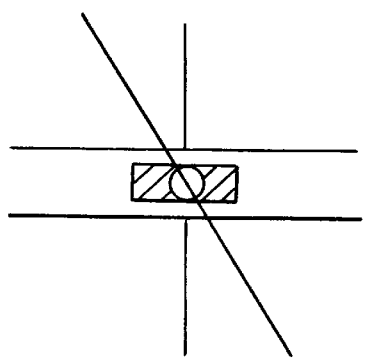
Figure 4D:
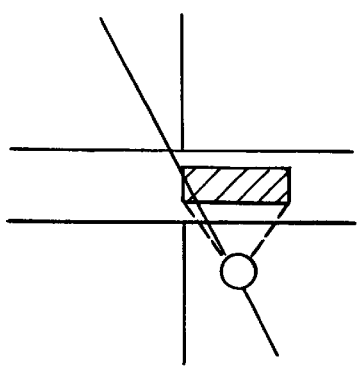
Figure 4E:
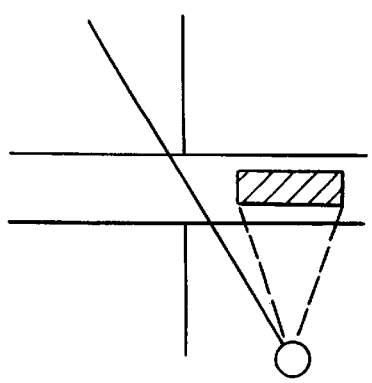

In FIG. 3, the drive 18 is depicted as an endless chain or timing belt 19, entraining small sprocket or pulley 20 on axle 16, large sprocket or pulley 21 on axle 13, and idler pulleys 22 and 23 that turn the direction of the chain or belt. The small sprocket or pulley 20 and the large sprocket or pulley 21 define the turning ratio of the driver wheel 15 and train wheel 12. A driven device 140 may be coupled to driven shaft 13; and all elements are properly sized. Device 140 may comprise the drive train of a vehicle such as an automobile.

It should be noted that since the force of the driver magnet on the train magnet is inversely proportional to the square of the distance between them, the greatest force on the train wheel will occur at the time the driver magnet is close to each train magnet. This was confirmed by Example 1.

EXAMPLE 1

A 6.625 inch diameter train wheel 12 was constructed with eight (8) two inch long driven rod magnets, 0.75 inches in diameter, mounted radially, with approximately 1.875 inches between each pole at the periphery of the wheel. The margin of the wheel was marked at 5 degree increments around its circumference and it was placed vertically in a cradle mounted on the pan of a triple beam balance.

A 10 inch diameter driver wheel 15 was constructed with 2 one inch long driver rod magnets, 0.75 inches in diameter, mounted on opposite sides of the wheel. One driver magnet 10 was mounted with its north pole at the periphery of the wheel and the other 10a was mounted with its south pole at the periphery of the wheel. The margin of the driver wheel was marked at 20 degree increments around its circumference to simulate a 1:4 turning ratio. The driver wheel 15 was mounted horizontally so that the driver magnets 10 and 10a would pass through the neutral corridor of each of the bipoles on the train wheel 12, which was mounted vertically on the pan of the balance. The distance between the two wheels was 0.5 inches. Net vertical forces, in grams, were measured on the triple beam balance at each of the 72 marked increments to indicate the force exerted on the periphery of the train wheel 12.

The results are shown in FIG. 5. The angular rotation forces were recorded as a series of pulses which occurred when a pole of a driver magnet came into position between the bipoles of the train magnets, as in FIG. 4C. In a second version of this experiment, six north pole driver magnets and six south pole driver magnets were used instead of one of each. The distance between the two wheels was one inch.

FIG. 6 shows that under these conditions the pulse widths of the forces could be broadened in order to smooth the rotation. In other experiments it was observed that increasing the number of train magnets could further broaden the pulse widths at the force zones.

EXAMPLE 2

A simple working model of the system as shown in FIG. 3 was constructed using a system of gears instead of an endless belt with pulleys. The train wheel 12 was a 7 inch diameter rotor with 8 radially positioned rare earth (NdFeB) rod magnets, 0.75 inches long and 0.75 inches in diameter. The driver wheel 15 was 10 inches in diameter and had single NdFeB magnets on opposite sides of the wheel. One driver magnet 10 was mounted with a north pole moving through each neutral corridor of the north-south bipoles while the second magnet 10a was mounted with a south pole moving through the neutral corridor of each of the south-north bipoles of the driven magnets while the driver wheel 15 was moving at a 4.1 ratio with respect to the driven wheel 12. The distance between the two wheels was 1.25 inches.

In order to evaluate the net torque of the force zones, a series of weights were placed on one side of the driver wheel 15 which was positioned with a driver magnet at its closest proximity to the bipoles of a force zone. Counterbalance weights were placed on the driven magnet rotor 12, just sufficient to stop the forward rotation of this rotor. The same measurements were made when the driven magnets were removed, to determine how much of the torque on the driven magnet rotor 12 was due to the magnetomotive force.

The data in FIG. 7 show that the increase in torque of the driven rotor when no magnets were present could be attributed to the 4:1 gear ratio. When the driven magnets were in place, the torque on the driven wheel increased by approximately 120 grams.

EXAMPLE 3

A modified model described in Example 2 was outfitted with a small DC electric motor 24 which was made to operate the wheels using two D size batteries. Instead of single driver magnets on each side of the driver wheel 15, four north pole rare earth (NdFeB) driver magnets and four south pole rare earth (NdFeB) driver magnets were used. The driven rotor 12 was 6.125 inches in diameter and contained 8 sets of 3 magnets with each set uniformly spaced and alternating north and south poles around the circumference of the rotor. The distance between the two wheels was 1.25 inches.

Rates of rotation of the driver wheel were determined with and without driver magnets in the driver magnet wheel 15. With all other conditions being equal, the rate of rotation produced by the electrical energy source (2.57 volts DC) when driver magnets were present was 65 rpm for the driven rotor 12 and 260 rpm for the driver wheel 15. When the driver magnets were removed, even increasing the voltage from 2.5 to 4.0 volts could not sustain continual rotation of the two wheels. Under this set of conditions, magnetomotive force was required to supplement the electromotive force to produce continual rotation.

EXAMPLE 4

A small electric generator was added to the model described in Example 3 and the electric motor was energized with three 1.5 volt DC batteries in order to compensate for the increased friction caused by the generator installation. With all magnets in place, the electric motor 24 moved the driven wheel 12 at 64 rmp and the driver wheel 15 at 256 rpm. At this speed the generator produced an output of 2.9 volts. Although this model was far from being optimized, this experiment supports the premise that magnetomotive force could amplify the electromotive force to produce work in the form of voltage generation.

EXAMPLE 5

The same model described in Example 2 was used to compare the rates at which size AA 1.5 volt DC batteries being used to drive the electric motor 24 decayed, with and without the driven magnets in place. The system was operated for one minute intervals for a total of five minutes for each condition, with the DC voltage of the batteries being recorded at the end of each minute. Fresh batteries were used at the beginning of each series.

The data in FIG. 8 show that the battery decay rate when magnetomotive amplification was used was significantly slower than when electromotive force was used alone. This principle could be important for applications such as electric automobiles, where batteries need to be recharged at frequent intervals.

New magnets can be substituted for any of the magnets on the rotor, as indicated at 150 and 151 in FIG. 3.

Usable magnets consist of a material or materials selected from the group that includes NdFeB, alnico, ceramic, iron-chromium-cobalt (FeCrCo), rare earth, samarium cobalt (SmCo), other magnetic material. Of these NdFeB is preferred.

Usable sources of torque comprise one or more of the following:
  i) an electric motor
  ii) an internal combustion engine
  iii) wind
  iv) flowing water
  v) manual or foot power
  vi) other power source.

I claim:

1. A device comprising, in combination:
    a) a train of driven magnets on a first rotor, each driven magnet having magnetically opposite poles which are separated,
    b) a circularly spaced sequence of driver magnets on a second rotor, each driver magnet having magnetically opposite poles,
    c) means for mounting said first and second rotors to have planes of rotation defined by said magnets, said planes being substantially perpendicular, for relative movement of the magnets to maintain driver magnet's poles substantially equidistant from the poles of the driven magnet as the driven magnets move relative to the driver magnets, and as the rotors rotate in synchronism,
    d) and a source of torque coupled to said second rotor to effect torque input to the second rotor, as may he needed for driving of the first rotor by the second rotor.

2. The combination of claim 1 wherein at least one of said magnets is a permanent magnet.

3. The combination of claim 1 wherein both of said magnets are permanent magnets.

4. The combination of claim 1 wherein said first rotor is mounted for rotation about a first axis.

5. The combination of claim 4 wherein said second rotor is mounted for rotation about a second axis.

6. The combination of claim 5 wherein said first and second axes are non-intersecting and are skewed.

7. The combination of claim 5 wherein said c) means includes means operatively coupled to said first and second rotors for synchronizing rotation thereof.

8. The combination of claim 6 wherein said second rotor is a driver rotor, said skewing of said axes characterized in that they form a right triangle having a base and altitude where:

base=0.5 times distance between north-south poles on the driven rotor
altitude=0.25 times circumference of the driver rotor.

9. The combination of claim 1 wherein said driver magnets in said train have north and south poles located in rotary sequence.

10. The combination of claim 1 wherein said magnets consist of a material or materials selected from the group that includes NdFeB, alnico, ceramic, iron-chromium-cobalt (FeCrCo), samarium cobalt (SmCo), other magnetic material.

11. The combination of claim 1 wherein said rotors define a turning ratio having a value which is about 1:4.

12. The combination of claim 1 wherein there are multiple driven magnets on said first rotor, said driven magnets having poles that are uniformly spaced apart in north and south pole sequence along the periphery of the train rotor.

13. The combination of claim 1 wherein said source of torque comprises one of the following:
  i) an electric motor
  ii) an internal combustion engine
  iii) wind
  iv) flowing water
  v) manual or foot power
  vi) other power source.

14. The combination of claim 13 wherein said motor is battery driven.

15. The combination of claim 14 including a driven device coupled in driven relation with said driven rotor.

16. The combination of claim 15, wherein said device is the drive train of an automobile.

17. A device comprising, in combination:
  a) a driven magnet having magnetically opposite poles which are separated,
  b) a driver magnet having magnetically opposite poles,
  c) means for mounting said magnets for relative movement to maintain one of the driver magnet's poles substantially equidistant from the poles of the driven magnet as the driven magnet moves relative to the driver magnet,
  d) there being a train of said driven magnets, and said c) means including a first rotor mounting said train of driven magnets for rotation abut a first axis,
  e) there being a circularly spaced sequence of said driver magnets, and said c) means also including a second rotor mounting the driver magnets for rotation about a second axis,
  f) and wherein said driven magnets extend circularly on said first rotor, and said driver magnets extend radially on said second rotor.

18. The combination of claim 17 wherein
  i) the first rotor has circumference along which said driven magnets extend, in a train,
  ii) the driven magnets have equal lengths,
  iii) said circumference is twice the length of each driven magnet multiplied by the number of said driven magnets,
  iv) the driven magnets being spaced apart.

19. The combination of claim 18 wherein the minimum distance "d" between driver and driven magnets being rotated on said rotor is $M_1 \times M_2/d^2=0$, where
  $M_1$=magnetic force of 10
  $M_2$=magnetic force of 11.

20. A device comprising, in combination:
  a) a driven magnet having magnetically opposite poles which are separated,
  b) a driver magnet having magnetically opposite pole,
  c) means for mounting said magnets for relative movement to maintain one of the driver magnet's poles substantially equidistant from the poles of the driven magnet as the driven magnet moves relative to the driver magnet,
  d) there being a train of said driven magnets, and said c) means including a first rotor mounting said train of driven magnets for rotation abut a first axis,
  e) there being a circularly spaced sequence of said driver magnets, and said c) means also including a second rotor mounting the driver magnets for rotation about a second axis,
  f) and wherein said first rotor is a flywheel, and said train of magnets is located at the circumference of the flywheel.

21. A device comprising, in combination:
  a) a driven magnet having magnetically opposite poles which are separated,
  b) a driver magnet having magnetically opposite poles,
  c) means for mounting said magnets for relative movement to maintain one of the driver magnet's poles substantially equidistant from the poles of the driven magnet as the driven magnet moves relative to the driver magnet,
  d) there being a train of said driven magnets, and said c) means including a first rotor mounting said train of driven magnets for rotation abut a first axis,
  e) there being a circularly spaced sequence of said driver magnets, and said c) means also including a second rotor mounting the driver magnets for rotation about a second axis,
  f) and wherein said driven magnets in the train are relatively narrow bar-shaped permanent magnets.

22. A device comprising, in combination:
  a) a driven magnet having magnetically opposite poles which are separated,
  b) a driver magnet having magnetically opposite poles,
  c) means for mounting said magnets for relative movement to maintain one of the driver magnet's poles substantially equidistant from the poles of the driven magnet as the driven magnet moves relative to the driver magnet,
  d) there being a train of said driven magnets, and said c) means including a first rotor mounting Raid train of driven magnets for rotation abut a first axis,
  e) there being a circularly spaced sequence of said driver magnets, and said c) means also including a second rotor mounting the driver magnets for rotation about a second axis,
  f) and wherein the first rotor is a flywheel, and said driven magnets in the train are lengthwise substantially rectangular permanent magnets.

* * * * *